INVENTORS
Thomas W. Kirkconnell and
BY Robert N. S. Chiang
Lockwood, Woodard, Smith & Weikart
Attorneys INVENTORS
Thomas W. Kirkconnell
BY and Robert N. S. Chiang Lockwood, Woodard, Smith & Weikart
Attorneys INVENTORS.
Thomas W. Kirkconnell and
BY Robert N. S. Chiang
Lockwood, Woodard, Smith & Weikart
Attorneys March 14, 1967 T. W. KIRKCONNELL ETAL 3,308,559

CHEAT-PROOF PROGRAMMED-LEARNING DEVICE WITH MOTORIZED LESSON SHEET CONTROLLED BY STUDENT

Filed May 5, 1964

6 Sheets-Sheet 4

INVENTORS
Thomas W. Kirkconnell
BY and Robert N. S. Chiang

Lockwood, Woodard, Smith & Weikart
Attorneys

INVENTORS
Thomas W. Kirkconnell
BY and Robert N. S. Chiang
Lockwood, Woodard, Smith & Weikart
Attorneys INVENTORS
Thomas W. Kirkconnell
BY and Robert N. S. Chiang
Lockwood, Woodard, Smith & Weikart
Attorneys United States Patent Office 3,308,559

Patented Mar. 14, 1967

3,308,559

CHEAT-PROOF, PROGRAMMED-LEARNING DEVICE WITH MOTORIZED LESSON SHEET CONTROLLED BY STUDENT

Thomas W. Kirkconnell and Robert N. S. Chiang, Vincennes, Ind., assignors of one-third to Vincennes University, Vincennes, Ind., a corporation of Indiana Filed May 5, 1964, Ser. No. 365,063

14 Claims. (Cl. 35—9)

This invention relates generally to educational devices, and more particularly to a simple and inexpensive machine useful for teaching and testing students in programmed learning courses, for providing a progressive display effect for self study purposes, and for providing instruction in speed reading, for example.

Many types of teaching machines are known and available on the market. These machines are principally employed in educational programs where a student is allowed to progress at his own pace. In these programs the faster students can be supplied with educational material at a faster rate than can be handled by slower students. This system is sometimes referred to as programmed learning.

Many teaching machines heretofore available have been expensive, heavy, complex or bulky. Many machines which are available do not provide any easy means for the instructor to determine the progress of the student, and do not provide any fool-proof means for assuring that cheating does not take place when the machine is used in a testing function. Moreover, many of the machines heretofore available have been somewhat limited in the nature of the instructional material which they are capable of utilizing.

It is therefore a general object of the present invention to provide an improved educating machine.

A further object is to provide a machine capable of using a variety of types of educational material.

A further object is to provide a machine by which a student can be tested as he learns and a record of his progress is maintained with no chance of his cheating.

A further object is to provide a machine capable of use in speed reading instruction and also capable of providing interesting presentations of educational material.

Described briefly, a typical embodiment of the present invention includes a case having a viewing window therein with means for illuminating the window from above with ultraviolet light of approximately 3640 Angstroms wavelength, sometimes referred to as "black light," and means below the window for producing light in several colors. Reels and reel drive means are provided in the case for displaying educational material provided on paper or other sheet material which is rolled from one reel to another reel. The paper is provided with groups of instructional lessons printed in various colors of ink and also in an ultraviolet sensitive ink.

A rotary selector switch arrangement is provided with four positions for testing a student. The student may select any one of the four positions to select one of several possible answers to a test question on the sheet. The switch cooperates with perforations in the paper or with a separate tape synchronized with the paper to accomplish the closing of one of the illuminating circuits if the answer selected is incorrect. Circuitry is provided such that if the student selects the correct answer, the paper will be advanced to display the next test question.

A counter is also provided so that if the wrong answer is selected by the student, the counter is advanced. The switch is of a nature such that cheating cannot take place and every time a wrong answer is selected, the counter is advanced.

A mode control determines whether the machine will be used for testing, self study, or speed reading. This control must be set in the testing position in order to enable use of the aforementioned switch for selection of answers.

The mode control may be moved to a "manual" position where it disables the testing functions of the selector switch. In this position, it closes a switch to the ultraviolet bulb, thus energizing this bulb, and it also covers the viewing window (or screen) with an ultraviolet light absorber sheet. Assuming that the special study material is in position under the viewing screen, the mode control knob may then be turned in the reverse direction. This moves the ultraviolet light absorber from a position in front of the study sheet to display the writing thereon in ink which is illuminated by the ultraviolet light. When the sheet has been completely moved to the end of the viewing screen, a switch is closed which energizes a motor to move the study sheet another step. There is a hole in the sutdy sheet corresponding to each frame so that each time the ultraviolet light absorber is moved down to the end of the viewing screen, an electrical contact can be made through the sheet to close the motor circuit to advance the next frame.

For the speed reading function, the selector switch knob on top of the machine is moved to the S position. Then the mode control knob on the side of the machine is turned to the S position. This turns on the ultraviolet light and starts the motor. The reading material then moves along under the screen and is illuminated by the ultraviolet light as it moves. This provides a pace for the student to maintain while reading in order to avoid missing anything as it passes through the viewing area.

The full nature of the invention will be understood from the accompanying drawings and the following description and the claims.

Figures 1, 2:
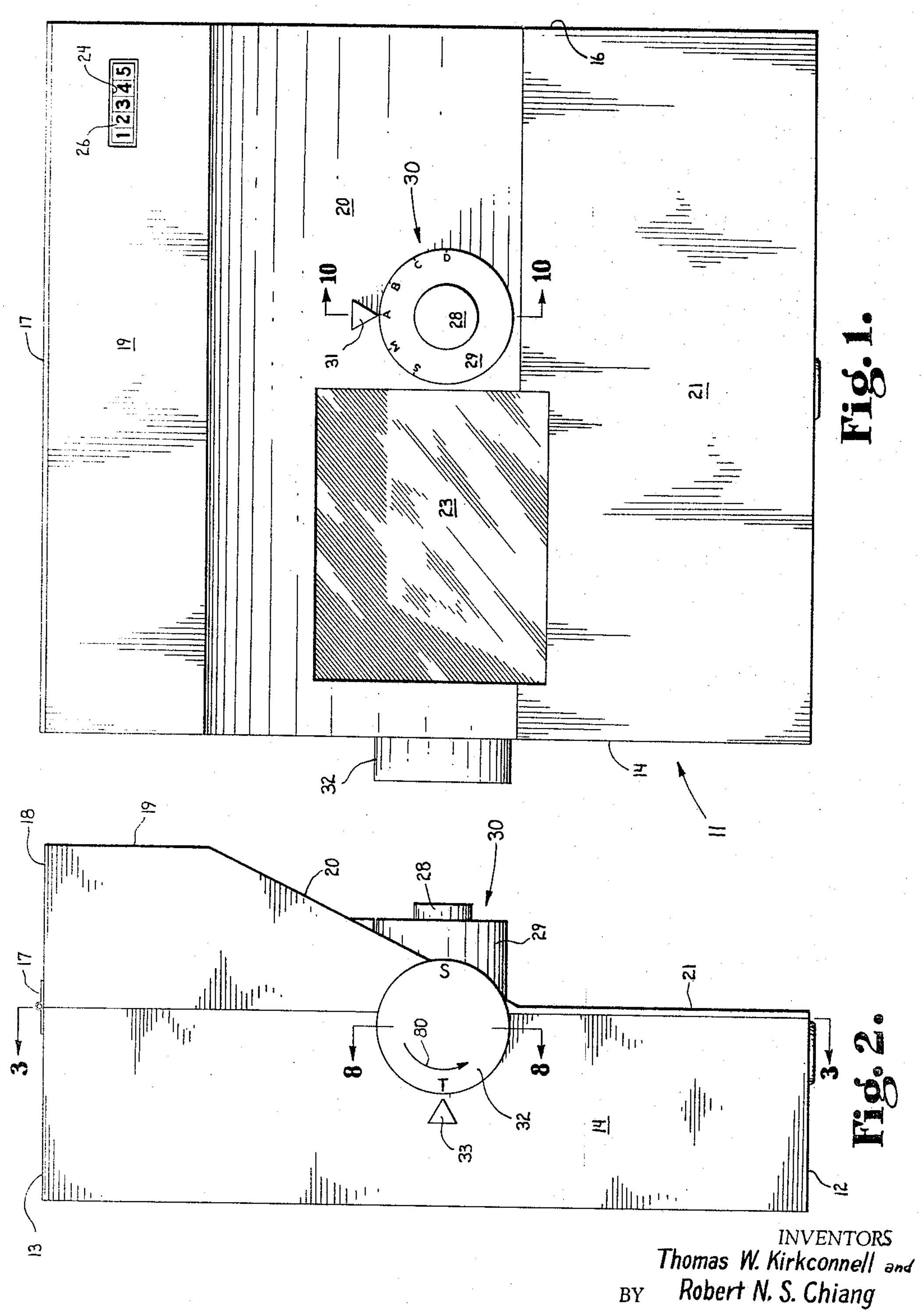
FIG. 1 is a top plan view of a typical embodiment of the present invention.
FIG. 2 is a side thereof.
Figure 3:
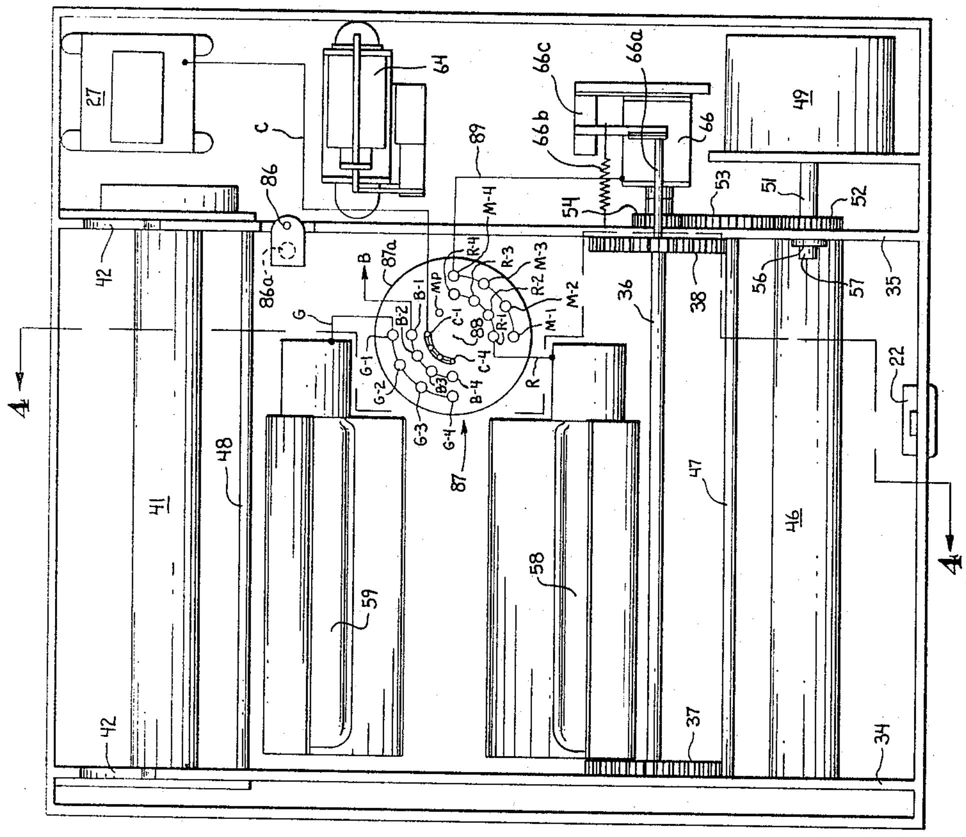
FIG. 3 is a horizontal section taken along the line 3—3 in FIG. 2 and viewed in the direction of the arrows.

Referring to the drawings in detail, and particularly FIGS. 1, 2, and 3 thereof, the illustrated machine includes a housing or case 11 having a rectangular portion with upstanding front and rear walls 12 and 13, respectively, and left hand and right hand walls 14 and 16, respectively. A hinge 17 is attached to the rear wall and to an upstanding rear wall portion 18 of a cover member which includes an upper rear portion 19, a downwardly sloping intermediate portion 20 and a flat frontal portion 21. The cover may be secured in the closed position by a key operated latch assembly adjacent its front marginal edge, a portion 22 of this latch assembly being apparent in FIG. 3.

A horizontal transparent viewing screen or window 23 is provided flush with the front portion 21 of the cover. The position of this window can be readily understood by referring to FIGS. 4 and 6 along with FIG. 1. An opening 24 is provided in the portion 19 of the cover and exposes the register numbers 26 of a counter 27 (FIG. 3).

A push button 28 and rotary knob 29 of a selector switch assembly 30 are exposed in the inclined panel 20 of the cover. The rotary knob includes markings at predetermined angular relationships with respect to the axis thereof and these are as follows in order: S, M, A, B, C, and D. A stationary pointer 31 is provided on the inclined panel portion 20. A mode control knob 32 is mounted to the side 14 of the case and is provided with the markings S and T thereon with approximately 180° spacing therebetween. A fixed pointer 33 is provided on the side wall 14.

Figure 4:
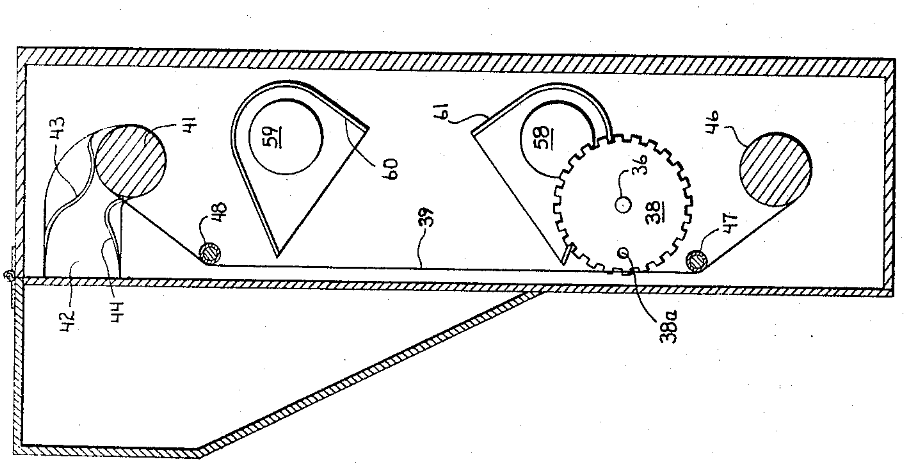
FIG. 4 is a section taken along the line 4—4 in FIG. 3 and viewed in the direction of the arrows.

Referring now to FIGS. 3 through 6, some of the interior components will be described. Parallel upstanding mounting walls 34 and 35 are provided in the housing and support a sprocket shaft 36 upon which sprockets 37 and 38 are affixed. The purpose of the sprockets is to engage holes in the lesson sheet used with the machine to control the driving of the sheet. The sheet is omitted from FIG. 3 but is shown in FIG. 4 and designated by the reference numeral 39. It is supplied from a reel or spool 41 which is received in a groove 42 provided in each of the walls 34 and 35. Suitable spring leaves 43 and 44 provided in the grooves secure the spool in position once installed. The front spool 46 may be mounted in the same way if desired. Horizontal support rolls 47 and 48 are provided and may be in the form of a rod with a sleeve rotatable thereon, though other suitable means may be employed.

The motor 49 provides power to the shaft 51 which drives the shaft 36 through a set of gears 52, 53, and 54. Other means for driving the shaft 36 by the motor may be used, if desired. A friction drive for the front spool 46 from the shaft 51 may be provided by employing a keyed shaft 57 keyed to the spool and coupled to the drive shaft 51 by a spring loaded friction disc clutch 56. The clutch 56 is not a positive drive member inasmuch as some rotational speed differential between the shaft 36 and spool 46 will be required as the amount of paper wound onto the spool 46 increases. Therefore, by providing a simple clutch which can slip slightly if necessary, sufficient torque can be applied to the spool 46 to maintain proper tension in the sheet and wind the sheet on the spool and yet allow for the relative speed change required as the winding diameter increases with the winding of more paper on the spool.

A red showcase lamp 58 and a green showcase lamp 59 are mounted below the sheet 39 and their reflector housings 61 and 60, respectively, are directed toward the sheet and window 23. An ultraviolet bulb 62 (FIG. 6) is mounted above the window 23 and below the overhanging portion 20*a* of the inclined surface 20 of the cover. A suitable reflector shield 63 is provided to direct light down to the screen or window from the ultraviolet bulb. Standard relays 64 and 66 are mounted in the case and relay 64 is the type which requires a pulse for setting and a pulse for re-setting whereas the relay 66 is pulse setting but re-sets itself (FIG. 3).

The armature of relay 66 has a key means in the form of a pin 66*a* secured thereto. This pin is normally received in an aperture 38*a* in sprocket 38 and thereby prevents driving of the paper. The relay also operates switch contacts 138 (FIG. 7) in a manner which will later be described.

Figure 6:
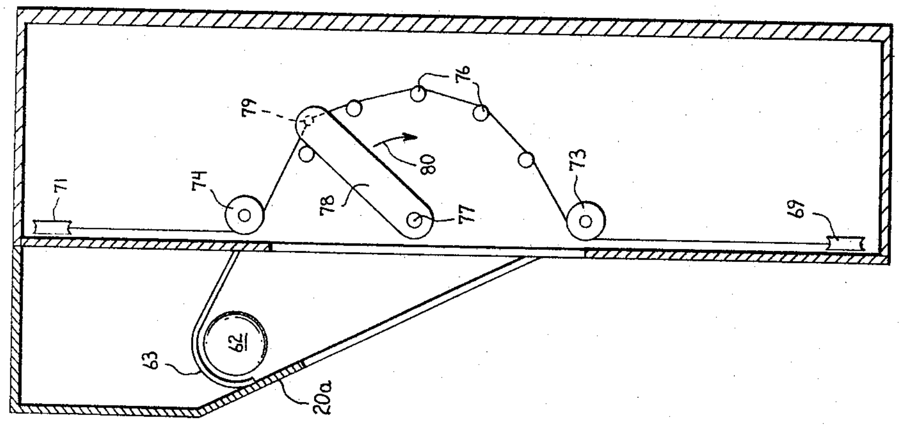
FIG. 6 is a section taken along the line 6—6 in FIG. 5 and viewed in the direction of the arrows.
Figure 5:
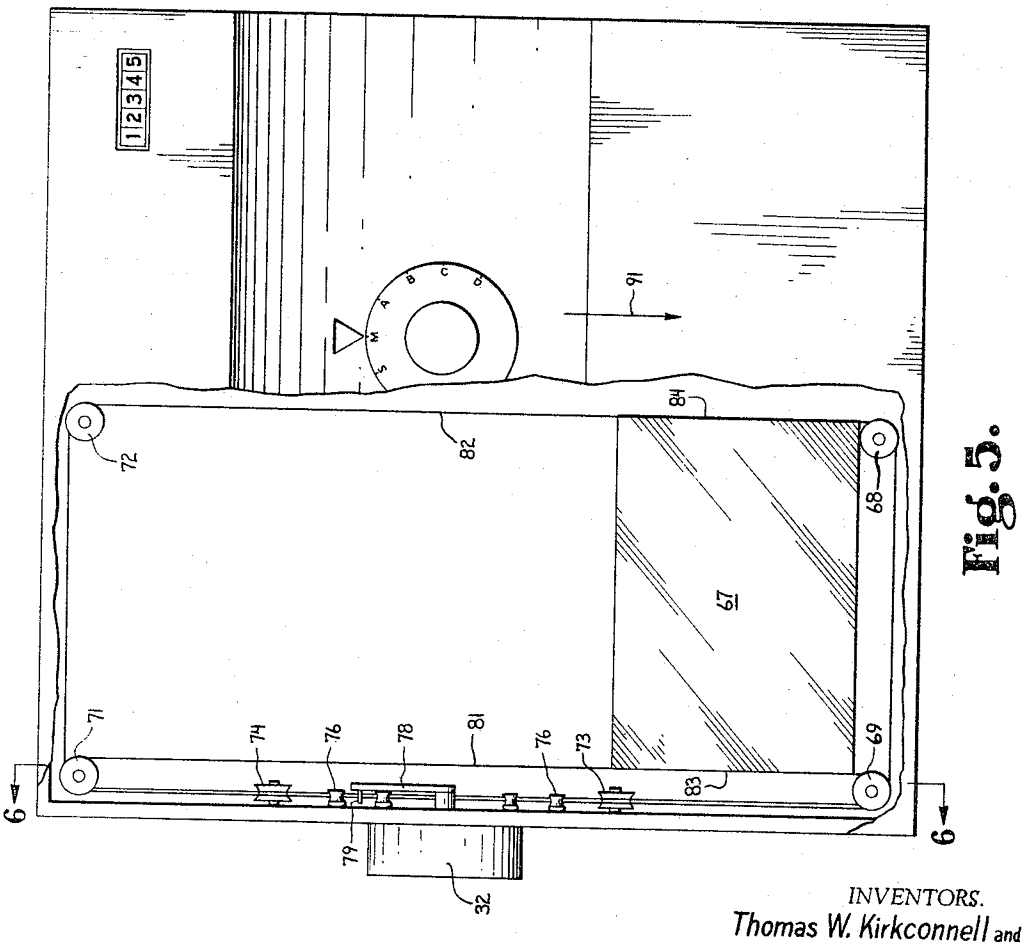
FIG. 5 is a top plan view with a portion broken away to show details of the ultraviolet light absorber sheet installation and drive means therefor.
Figure 8:
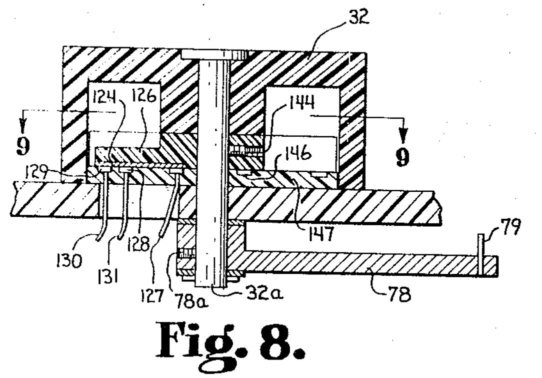
FIG. 8 is a section through the mode control knob taken along the line 8—8 in FIG. 2.

Referring particularly to FIGS. 5 and 6, the ultraviolet absorber sheet 67 is shown in storage position away from the window 23. Four pulleys 68, 69, 71 and 72, are shown mounted for rotation on vertical axes. Pulleys 73 and 74 are mounted for rotation on horizontal axes. Five guide rollers 76 are mounted in a circular array at uniform distance from the axis 77 of the control knob 32. As shown in FIG. 8, an arm 78 is attached by set screw 78*a* to the control know shaft 32*a* and is rotatable in unison therewith. It is provided with a pin 79 adjacent its outer end. Two separate endless strings 81 and 82 are connected to the pin 79 in a manner so that they are, in effect, affixed to the pin at the point of connection thereto. The string 81 is secured to the ultraviolet absorber sheet 67 along the lateral margin 83 thereof and extends around the pulleys 69, 71, 73, 74, and guide rollers 76. The string 82 is secured to the absorber sheet along the lateral margin 84 and extends around the pulleys 68, 69, 71, 72, 73, 74, and the guide rollers 76. It can be appreciated, therefore, that as the arm 78 is swung about the axis 77 in the direction of arrow 80 by means of the control knob 32, the light absorber sheet can be moved toward the rear of the case to cover the screen or window 23.

A switch unit 86 is mounted to the wall 35 and has a sensor 86*a* responsive to apertures in the lesson sheet 39 to close and operate an electrical circuit as will be described hereinafter (FIGS. 3 and 4).

A selector switch lower contact assembly 87 is provided and includes an array of contact pins or buttons disposed in block 87*a* and around an axis 88 which is co-linear with the axis of the button 28 and knob 29 of FIG. 1. Four contact buttons, G–1, G–2, G–3, and G–4, are disposed in an arc having the axis 88 at its center and these buttons are equally spaced. Each of the buttons may be considered to be spring loaded and may be of the nature shown in FIG. 13, for example. All four of the buttons are electrically connected together to the common conductor G connected to the green light bulb 59.

A similar set of buttons B–1, B–2, B–3, B–4 is provided in the assembly 87, and these may be identical to the previously described buttons. However, they are mounted on a common arc closer to the center 88 and each of the buttons is aligned radially with one of the previously described buttons. For example, button B–1 is on the same radial line as button G–1. All of these buttons B–1, B–2, B–3 and B–4, and which may be referred to as the ultraviolet buttons, are electrically connected to the conductor B which is connected to the ultraviolet bulb 62. This connection is not shown in FIG. 3 but will be apparent in the schematic diagram of FIG. 7 to be described hereinafter.

Another set of buttons, R–1, R–2, R–3, and R–4, is provided at the same radius as the series of ultraviolet buttons but the buttons of this set are disposed on an opposite side of the axis 88. In other words, buttons R–1 through R–4 are in a common circle with buttons B–1 through B–4 but are in an opposite sector of the circle.

Another set of buttons, C–1, C–2, C–3, and C–4, is provided still further toward the center 88 with each of these buttons being on a common radial line with one of the buttons in each of the ultraviolet and green light series. All of these buttons are connected to a common conductor C which is connected to the counter 27.

Another set of buttons, M–1, M–2, M–3, and M–4, is provided at the same radius as the set of buttons beginning with the prefix G and this set is connected to the relay 66 for energization of the motor. The connection to relay 66 is through the conductor 89. Before referring to FIG. 7, it will be well to note that the travel of the lesson sheet in the machine is in the direction of the arrow 91 in FIG. 5.

Figure 7:
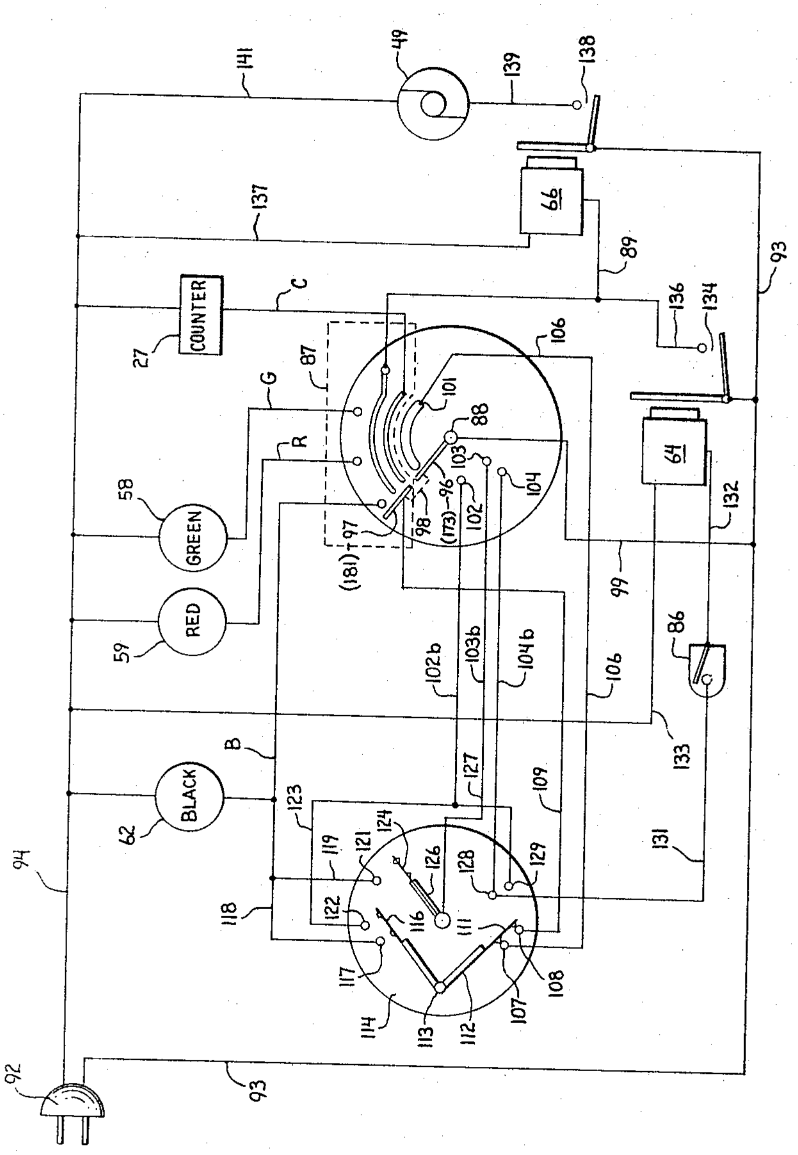
FIG. 7 is a schematic view of the electrical circuit of the illustrated embodiment.

Referring to the schematic diagram of FIG. 7, a standard electrical plug 92 is provided and may be connected to any 110 volt alternating current source. A supply line 93 and return line 94 are connected to the plug. The ultraviolet, green, and red bulbs 62, 59, and 58, as well as the counter 27, are all returned to the return line 94. The supply to these units is provided by way of the conductors B, G, R, and C, which were referred to in the description of the selector switch lower contact assembly 87. They are all, therefore, brought into the box designated 87 in FIG. 7.

A movable contactor 96 is shown and another movable contactor 97 is also shown, these being mechanically though not electrically connected together, and the mechanical connection being designated by the dotted line 98. For purposes of illustration, it is assumed that each of these contactors is rotatable with respect to the axis 88. It should be understood that the contactor 97 is a bridging type of contactor and can connect together at any one time, one of the three conductors leading to the lights, the conductor C leading to the counter, and the conductor 89 leading to the motor control relay 66.

The contactor 96 is supplied by the conductor 99 and a contact strip 101 is provided so that a supply will be provided from the conductor 99 to the contact strip 101 whenever the contactor 96 is in a proper rotational position to achieve contact of the contactor 96 with the strip 101. At other rotational positions of the contactor 96 it can contact the strip 102, and at another rotational position it can simultaneously contact the strips 103 and 104.

When the contactor 96 is contacting the strip 101, the testing functions of the machine can be accomplished. When it is contacting the strip 102, the self-study, progressive display, function of the machine can be performed. When the contactor is bridging the strips 103 and 104, the speed reading function of the machine can be performed.

A conductor 106 extends from the contact strip 101 to the contact point 107. A contact point 108 is connected through a conductor 109 to the bridging contactor 97. In order to complete an electrical path from conductor 106 to 109, it is necessary to bridge the contact points 107 and 108 by a bridging contactor 111. This bridging contactor is carried on an L-shaped contact carrying arm 112, pivotally mounted at 113 to a base 114. This arm carries an additional bridging contactor 116.

A contact point 117 is connected by the conductor 118 to the ultraviolet bulb 62. The conductor 119 is also connected to conductor 118 and is connected to a contact point 121. A contact point 122 is connected by the conductor 123 to the contact strip 102. A bridging contactor 116 is carried on the other arm of the contact carrying arm 112 and is capable of bridging the contact points 117 and 122 to complete an electrical path from the contact strip 102 to the ultraviolet bulb 62. It should be noted at this point that the arm and contact points are constructed and located so that bridging contact between the points 117 and 122 cannot be accomplished at the same time that bridging contact is made between the points 107 and 108.

The contactor 124 on the arm 126 is connected to the conductor 127. It is engageable with the contact point 121 and also with the contact points 128 and 129. Contact point 129 is connected by the conductor 123 to the contact point 122 and is also connected to the terminal strip 102. Contact point 128 is connected through the conductor 131 to the switch 86. Switch 86 is connected by the conductor 132 to the operating coil of relay 64, which is returned to the return line 94 by means of the conductor 133.

A relay switch 134 is connected in the branch 136 between the supply line 93 and the conductor 89 connected to the operating coil of motor control relay 66. Energization of the relay 64 closes the switch 134 to provide supply potential from the line 93 to the coil of relay 66 which is returned to the return line 94 by means of the conductor 137. This motor control relay 66 controls the relay switch 138 in the circuit branch 139 feeding the motor 49 from the supply line 93, the motor being returned to the return line 94 by the conductor 141.

Figure 9:
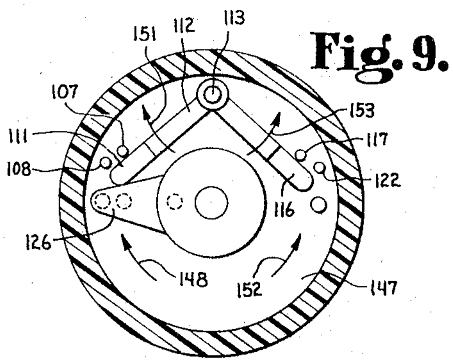
FIG. 9 is a section taken along the line 9—9 in FIG. 8 and showing a typical arrangement of contacts in the mode control switch.

Referring now to FIGS. 8 and 9, the control knob 32 is secured to the shaft 32*a* to which the arm 78 is secured by means of the set screw 78*a*. The contact arm 126 (shown schematically in FIG. 7) is also secured to the shaft by means of the set screw 144. A spring contactor 124 is mounted to the underside of the arm 126 and is continuously maintained in electrical connection with the conductor 127 by means of the arcuate conductor ring 146 provided in the terminal board 147 which was shown schematically in FIG. 7 as number 114. The contact points 128 and 129 are provided in the terminal board 147. The contact points 107, 108, 122, 117, and 121, referred to in the description of FIG. 7, are provided in this same terminal board although they are not shown in FIG. 8 in order to avoid confusion in the illustration.

The L-shaped member 112, pivotally mounted to the terminal board 147 supports the two bridging contact springs 111 and 116. The shape of the arm 126 is such that when it is rotated in the direction of the arrow 148, it can engage the arm 112 and move it in the direction of the arrow 151 to engage the contactor 111 with the contact points 107 and 108. At this time the contactor 116 is removed from the contact points 117 and 122. On the other hand, if the arm 126 is rotated in the direction of the arrow 152, it can be rotated to the point where there is engagement thereof with the other arm of the member 112 to push it counter-clockwise in the direction of the arrow 153 removing the contactor 111 from the contact points 107 and 108 and making contact between the contactor 116 and the points 117 and 122. Thus it is seen that while the contacts 117 and 122 are bridged, the contact points 107 and 108 cannot be bridged and vice versa.

In FIG. 8, the conductors 130, 131, and 127 are shown connected to their respective contact points and the remaining conductors mentioned in FIG. 7 are not shown in order to avoid confusion in the drawing. However, the illustration of the three mentioned conductors may be taken as just one example of how the connections may be accomplished.

Figures 10, 11, 14, 15:
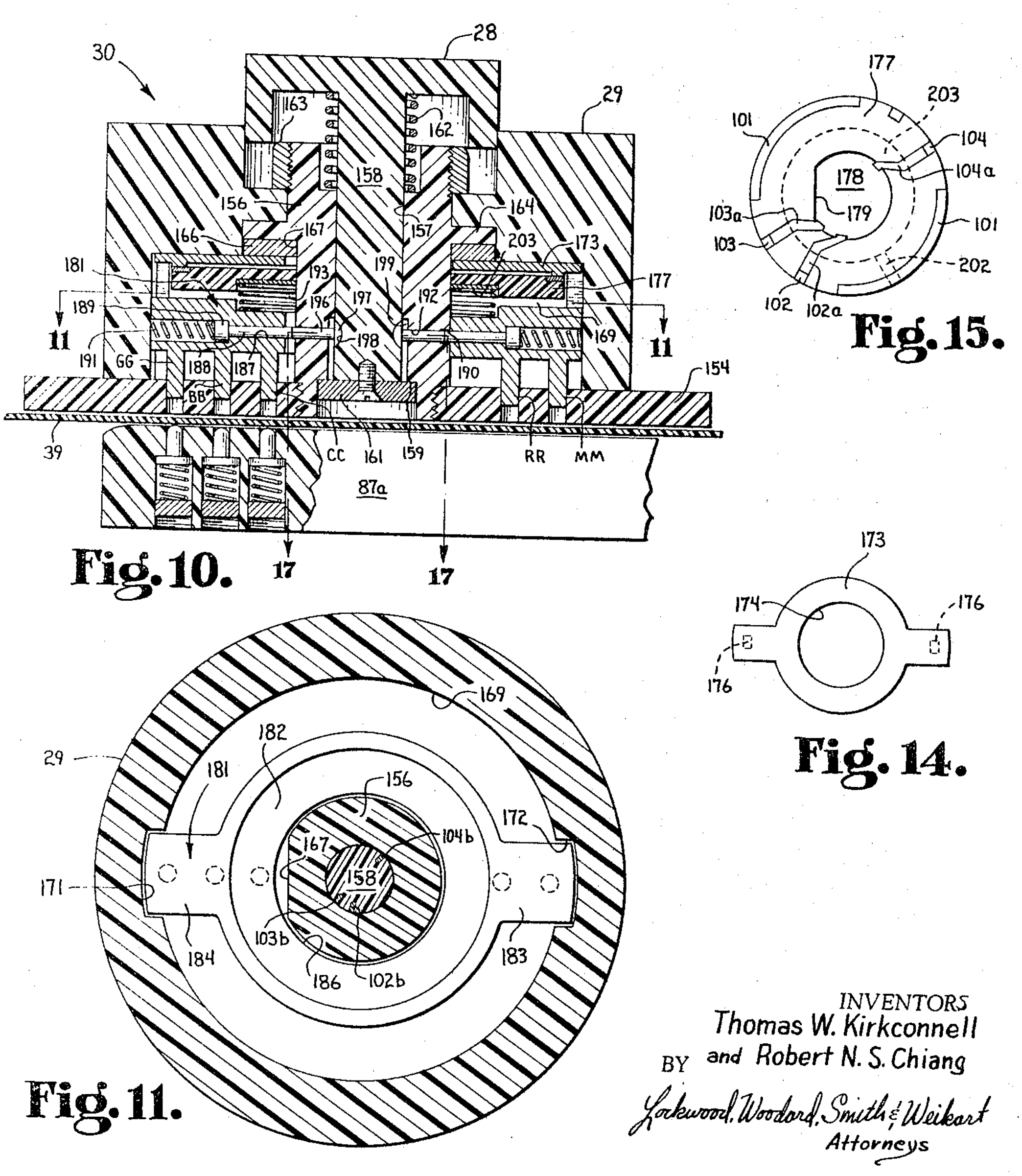
FIG. 10 is a section through the selector switch assembly taken along the line 10—10 in FIG. 1 and viewed in the direction of the arrows.
FIG. 11 is a section through a portion of the selector switch, taken along line 11—11 in FIG. 10 and viewed in the direction of the arrows.
FIG. 14 is a top plan view of a rotary contactor of the selector switch.
FIG. 15 is a top plan view of a non-rotary contact strip assembly for the selector switch.

Referring now to FIG. 10, additional details of the selector switch will be described. The assembly includes a base member 154 which is shown in top plan view in FIG. 12. The base includes three rings of apertures. These apertures are disposed in two circular grooves and one semi-circular groove. In the outer groove, there are the apertures *g*–1, *g*–2, *g*–3, *g*–4, and *m*–1, *m*–2, *m*–3, and *m*–4. These are all disposed in registry with the pins bearing corresponding reference numerals in FIG. 3 but with the prefixes thereof being in capital letters. Similarly, apertures are provided in the intermediate ring and in the inner ring corresponding to pins previously described with reference to FIG. 3. There are two additional sets of apertures in the rings whose purpose will be described hereinafter.

Figures 12, 13, 16, 17, 18:
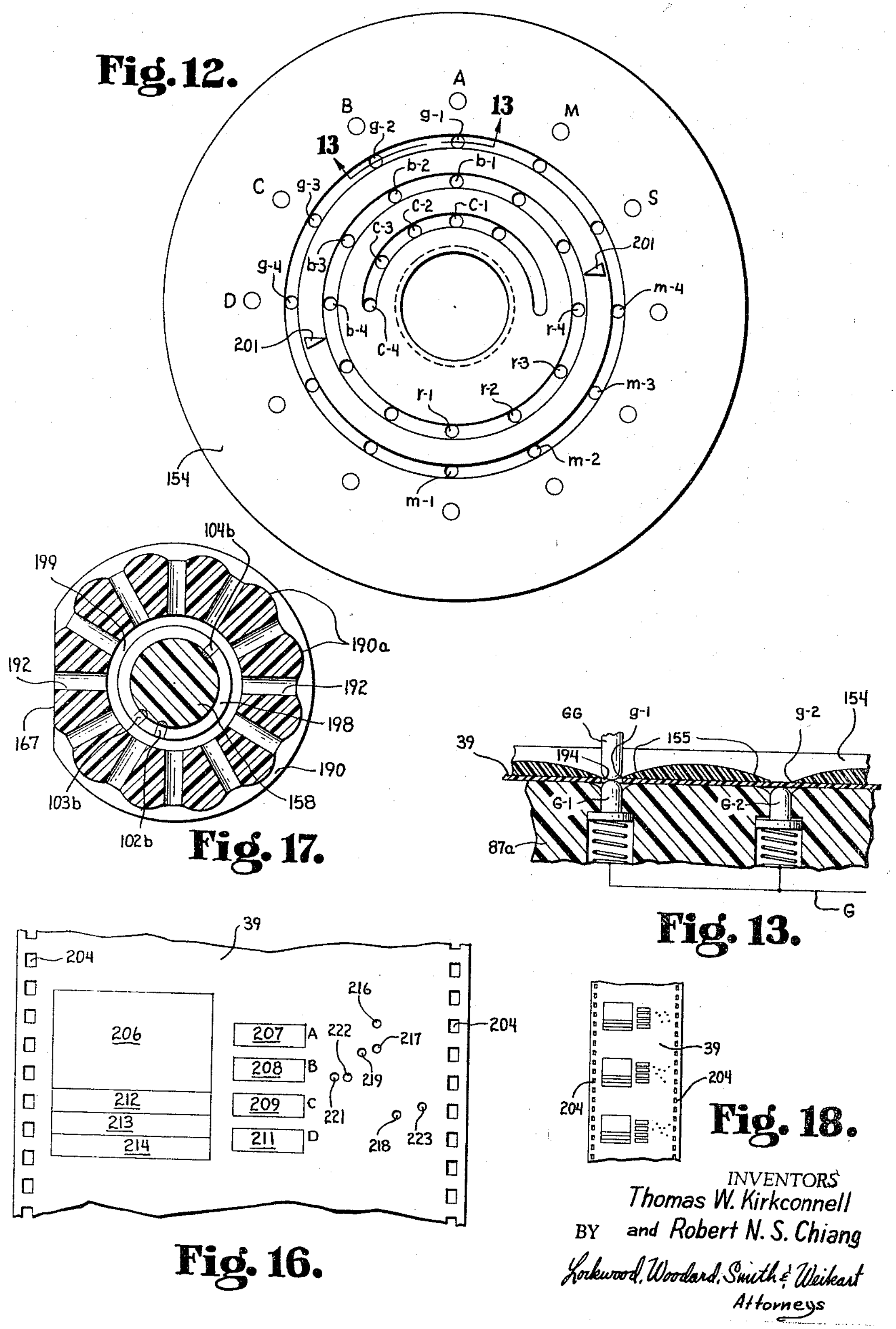
FIG. 12 is a top plan view of a base portion thereof.
FIG. 13 is an enlarged fragmentary section through the selector switch lower contact assembly, taken along the arc 13—13 in FIG. 12.
FIG. 16 is a fragmentary view of a section of paper which may be used according to the invention.
FIG. 17 is a fragmentary section of a portion of the selector switch assembly, the section being taken along line 17—17 in FIG. 10 and viewed in the direction of the arrows.
FIG. 18 is a reduced scale fragmentary view of the paper sheet 39 of FIGS. 4 and 16 illustrating a plurality of discrete information units similar to the single unit of FIG. 16, and spaced along the sheet at equal intervals.

As can be observed in FIG. 13, which is a section taken at 13—13 in FIG. 12, the bottom of the groove adjacent the apertures *g–1* and *g–2* is sloped as at 155. This sloped arrangement is provided adjacent all of the apertures in the various grooves. The purpose of the slope will become apparent as the description proceeds.

Referring further to FIG. 10, a column 156 is threadedly received in the base 154. This column has a central bore 157 therein which receives the stem 158 of the push button 28. A shoulder 159 is provided near the lower end of the bore 157 and a plate 161 is secured to the bottom end of the stem 158. The button return spring 162 thereby normally holds the button in the position shown whereupon the plate 161 engages the shoulder 159 preventing the button, which is spring loaded upwardly, from popping out of the knob 29.

A retainer ring 163 is threadedly received on the top of the column 156 and retains the knob 29 in position as shown. A flange 164 on the column 156 supports the knob 29. Therefore, the vertical position of the knob is established by the flange and retainer ring but the knob can rotate on the column. An electrical contact washer 166 is mounted to the column below the flange 164 and is electrically conductive. A vertically extending flat is provided on the column at 167 and a matching flat is provided on the washer at 166 to prevent rotation thereof on the column.

A generally cylindrical cavity 169 is provided in the underside of the knob. However a pair of vertical grooves 171 and 172 (FIG. 11) are provided in the outer wall of this cavity recess for purposes which will become apparent.

A conductor ring 173, of the form shown in top plan view in FIG. 14, is mounted to the column 156 and centered thereon by reason of the aperture 174 in the ring. This ring is electrically conductive and contains a pair of contact feet 176 on its underside. This ring member corresponds to the schematically illustrated contactor 96 in FIG. 7.

A contact strip assembly includes contact strip ring 177 and a top plan view of this assembly is shown in FIG. 15. This ring also has an aperture 178 therein. However, the aperture has a flat 179 which cooperates with the flat 167 on the column 156 to prevent rotation of this member.

A contact bridge member 181 is provided. The relationship of this member to the selector knob 29 is apparent in FIGS. 10 and 11. This member 181 corresponds to the schematically illustrated bridging contactor 97 in FIG. 7. It will be observed in FIG. 11, that member 181 includes a ring portion 182 with wings 183 and 184 extending therefrom. These wings are received in the grooves 172 and 171 respectively of the knob. Therefore, because the aperture 186 in the center of this member is completely circular, this member can be rotated on the column 156 by turning the knob 29. The wings on the conductor ring member 173 are also received in the grooves 171 and 172 and are rotated simultaneously with member 181 by the rotation of the knob 29.

As can be seen in FIG. 10, the member 181 includes radial bores 187 therein, disposed 180° apart. In each of these bores is a pin 188 having a head 189 thereon to limit the extent its inward travel as caused by the coil spring 191 loading the pin and tending to force it toward the center of the unit. Corresponding radial apertures 192 are provided in the column 156. The pins 188 extend into the apertures 192 in the column 156. Therefore, while there is a coil spring 193 tending to force the member 181 downwardly, these pins 188 extending into the apertures 192 of the column 156 prevent the member 181 from descending.

Five pins are shown integral with and depending from the member 181. These pins are designated by the reference characters MM, RR, CC, BB, and GG. These pins are all disposed in a line and at distances from the center of the member such that they will operate in one of the three grooves in the base 154. The pins are of a size such that they can pass through apertures in the base 154, shown in FIG. 12, if the member 181 is allowed to descend.

As shown in FIG. 13, if there is paper 39 disposed between the base 154 and the block 87*a*, and there is an aperture at 194 in the paper, the pin GG can make contact with the spring loaded pin G–1 through the aperture in the paper. At the same time, the remaining pins on member 181 and which engage the paper where there is no aperture, merely push the paper down, the paper being allowed to bulge downwardly by the contour of the block 87 around the pins therein. These remaining pins on member 181 which do not find an aperture in the paper, do not make contact with one of the conductive pins in the block 87*a*.

It was stated above that horizontal locking pins 188 in the member 181 extend into the apertures 192 in the column 156 and prevent the member 181 from descending. Special provision is made to permit descent when desired for contact purposes described immediately above. For this purpose, a release pin 196 is provided in each of the apertures 192 of the column 156. This pin has a rounded head 197 thereon and the button stem 158 has the annular groove 198 of a shape accommodating reception of these heads. Annular space 199 is provided in the column 156 to allow these heads to move outwardly upon depression of the button 28. This causes the pins 196 to move outwardly and move the locking pins 188 out of the apertures 192, whereupon the spring 193 can force the member 181 down to project the pins thereof through the apertures in the base 154.

As was noted previously, the knob 29 as shown in the FIG. 1 includes six markings. The knob is shown with the marking A in registry with the pointer 31 on the panel 20. If the button 28 is depressed with the knob in this position, the pins on the member 181 will pass through the apertures in the base 154 which have a postscript 1. In other words, the pin GG will pass through the aperture *g–1*, pin BB will pass through the aperture *b–1*. If there is a sheet of paper or tape or plastic or any other material disposed between the base 154 and the block 87*a*, it will prevent contact of these pins with the corresponding pins mounted in the block 87*a*. However, if the paper has any apertures therein accommodating the meeting of the pins, contact will be made. In the illustrated example, the paper contains an aperture 194 (FIG. 13) permitting contact between the pin GG and the pin G–1 in the block 87.

In addition to providing the means for pushing the member 181 downwardly, the spring 193 also maintains contact between the contact strips of contact strip ring member 177, the conductor ring member 173, and the contact washer 166.

In any of the four positions of the knob 29 designated by reference characters A, B, C and D, it must be possible for the member 181 to be released for projection through the apertures in the base 154 upon depression of the button 28. Therefore, there must be a set of apertures 192 and release pins in the column 156 and operable at each of these four angular positions of knob 29. A pair of stops 201 is provided on the base 154 to limit counterclockwise rotation of the knob 29 at registry of the mark D with the pointer 31 and to limit clockwise rotation at registry of the mark S with the pointer 31. To accomplish results which will be described hereinafter, it is necessary to permit the member 181 to descend when the knob is in either of the positions of registry of the mark M or the mark S with the pointer 31. Therefor, there are additional sets of apertures and release pins in column 156 operable to release the member 181 at these additional angular positions of the knob 29.

It was previously mentioned that the grooves in the base 154 are provided with ramps 155 adjacent the apertures. These ramps assist in raising the pins GG, BB, CC, RR, and MM to achieve elevation of the member 181 to the original position as the knob is rotated from one of the index positions to the next. When the pins have achieved contact with the highest portions of the grooves, the transverse locking pins 188 of member 181 again can enter the apertures 192 in the column 156.

From the foregoing description, it will be recognized that unless there is an annular groove in the column 156 of the selector switch, which would accommodate movement of thte locking pins 188 in a circle around the column, it would be impossible to turn the selector knob 29. This groove 190 is of a depth such that when the heads 189 of the locking pins are shouldered in the member 181, the inner ends of these locking pins will clear the bottom of the groove 190. Slight crowns 190*a* can be provided in the bottom of the groove between the successive apertures 192 in the column to provide a sort of detent action as the knob 29 is turned (FIG. 17).

To energize the contact washer 166, which supplies the rotatable wiper or conductor ring member 173 with current from the supply line 93 of FIG. 7, the conductor 99 of FIG. 7 (not sshown in FIG. 10) can be provided by means of a wire imbedded in the column 156. Accordingly, an electrical path from the supply line 93 is always complete to the wiper member 173.

As was previously mentioned, the wiper member 173 is rotated when the knob 29 is rotated and therefore is able to make bridging contact between designated wiper surfaces on the contact strip ring member 177. For example, when the knob is in any one of the four positions designated by the reference characters A, B, C, and D, the wiper will be making bridging contact between the conductive areas 101 on opposite quadrants of the member 177. By providing a conductor 202 from one of the surfaces 101 to the conductive ring 203 on the underside of this member, an electrical path from supply line 93 is complete to the spring 193 whose upper end engages ring 203. The spring 193 engages the conductive member 181 to energize the contact pins thereof, member 181 being electrically conductive material.

The conductive strips 102, 103 and 104 on member 177 are provided with separate conductive members 102*a*, 103*a* and 104*a*, respectively, leading into the aperture 178 and having a spring leaf portion extending into the aperture. These members can contact corresponding members 102*b*, 103*b*, 104*b* in grooves in the external surface of the column (FIG. 17) 156 which are then extended through the base of the column and base member 154 to their respective locations in the electrical circuit shown schematically in FIG. 7.

FIG. 16 is an example of a fragment of a roll of paper which may be used in the operation of this machine according to the testing function. The fragment is representative of a test question, and a very simple example which will be used to illustrate the operation. The sheet drive apertures 204 are evident at the lateral margins of the sheet. The question is printed in black ink in the area 206. Four possible answers are printed in the areas 207, 208, 209, and 211. Adjacent each of these answers is one of the four letters A, B, C, and D. Assume that the correct answer is the C answer. Then each of the three answers A, B, and D is incorrect. In the block 212 is an explanation as to why the A answer is incorrect. In the block 213 is an explanation as to why the B answer is incorrect and a hint to give the student an idea of what is the correct answer. Block 214 is an explanation of why the D answer is incorrect and a hint as to the correct answer. The material in block 212 is printed in red ink. The material in block 213 is printed in green ink, and the material in block 214 is printed in ultraviolet light sensitive ink. The questions and answers are printed in black ink.

In order to display the explanation 212 when the student selects the answer A in block 207, it is necessary to turn on the green light which will cause the red ink to appear gray or black and display the explanation in the block 212. Similarly, if the student selects the answer B in block 208, it is necessary to turn on the red light to display the explanation in the block 213. If the student selects the answer D in the block 211, it is necessary to turn on the ultraviolet light to display the answer explanation in the block 214. If the student selects the correct answer, we want the paper to be moved to display the next question and set of answers. Also, we wish to count the number of wrong answers selected by the student. In brief, therefore, each time a student selects an answer, there must be the illumination of a lamp plus the advancement of the counter; or in the event a correct answer is selected, there will be no illumination of the lamp and the sheet will be advanced.

In order to accomplish these effects, holes are provided in the paper in the proper location so that when the push button 28 is depressed after the knob 29 is rotated to the student's selection, the appropriate lamp will be turned on or the sheet will be advanced to the next question in case the student selects the correct answer. On the illustrated sheet fragment in FIG. 16, holes 216 and 217 are provided so that when the selector knob 29 is on the position A and the push button 28 is depressed, the green light will be illuminated and the counter will be advanced. Holes 218 and 219 are provided so that when the knob is on the position B, and the push button is depressed, the red lamp will be illuminated and the counter will be advanced. Holes 221 and 222 are provided so that when the knob is at the position of registry of the letter D with the pointer 31 and the button 28 is depressed, the ultraviolet will be illuminated and the counter will be advanced. The hole 223 in the paper is provided so that when the selector knob 29 places the letter C in registry with the pointer 31, and the button 28 is depressed, there will be energization of the motor to advance the next question into position below the window 23.

Thus, it is seen that for each question and group of answers, an appropriate array of holes is provided in the paper which will be positioned precisely over the block 87*a* and below the selector switch assembly.

*Operation*

In the operation of the present invention for the testing function, a sheet of paper having a number of questions and answers is provided and is usually in the form of a roll of paper carried between the reels 41 and 46 and driven by the motor. The material need not be paper, as other materials may also be suitable. In the illustrated embodiment, it is preferably that the material be able to transmit light or incorporate light transmitting areas so that the answers in red and green ink can be illuminated from below. The mode control knob 32 on the left hand side of the machine is placed in the position where there is registry of the pointer 33 with the letter T on the knob. This causes the arm 126 on the knob to bridge the contact points 128 and 129 and also causes the bridging contact 111 on the arm 112 to bridge the contact points 107 and 108. The bridging of the latter two contact points makes it possible to provide current to the member 97 of the selector switch. The electrical path from the supply line 93 to the contact point 107 is, however established through the contactor 173 (96 in FIG. 7) and this is accomplished when this contactor engages the conductive strip 101 on the contact strip ring member 177. This engagement will occur at all times that the selector knob 29 is in any one of the four positions where one of the letters A, B, C, or D is in registry with the pointer 31 on the panel section 20.

The student reads the question and based on which of the answers he believes to be correct, he moves the selector knob 29 to registry of the pointer 31 with the letter indicating the answer. He then pushes the button 28. If he has selected the wrong answer, one of the lights will illuminate the portion of the test paper explaining that this answer is incorrect and why it is incorrect and giving a clue as to the correct answer. Simultaneously, the counter will be advanced one-half step. The student can then rotate the selector knob which will extinguish the light and complete the advance of the counter.

He then selects another answer and presses the push button. If he has again selected the wrong answer, the appropriate light will illuminate the corresponding explanation and the counter will be advanced one-half step. When the student again rotates the knob to select another answer, the advance of the counter will be complete and the light will be extinguished. Assuming that the student finally selects a correct answer, the pressing of the button 28 will cause the motor to advance the sheet one question and the counter will not be affected. It causes the motor to advance the sheet because conductor 89 will be energized by contact between pin M—M of contact bridge member 181 and one of the buttons M–1, M–2, M–3 or M–4, through aperture 223 (FIG. 16) located on the sheet to correspond to the correct answer. Energization of conductor 89 energizes relay 66 whereupon the armature thereof pulls pin 66*a* out of aperture 38*a* (FIG. 3) and closes switch 138 (FIG. 7) to start the motor 49. When the motor moves the paper to break the continuity between member 181 and conductor 89, and de-energize relay 66, the aperture 38*a* wil have moved away from pin 66*a* and the end of pin 66*a* will ride on the surface of sprocket 38 until aperture 38*a* comes up again. Meanwhile, switch 138 will remain closed because the sprocket and pin keep the armature from being returned enough by spring 66*b* to open switch 138. When aperture 38*a* again comes into registry with the end of pin 66*a*, the pin will move into the aperture, allowing switch 138 to open and the motor to stop. The spacing of questions on the paper is so related to the sprocket 38 that when the motor stops, the next question is in proper position.

The above described operation can be performed for each question until the end of the roll of questions and answers and at that time the instructor can appraise the progress of the student by the number of wrong answers appearing on the register. Then the question and answer roll can be removed and replaced by a new roll of questions and answers.

When the invention is to be used for the progressive display phase for self study, the instructional material is again provided on a roll of paper which is inserted and operated in the machine in the same manner. However, for this purpose, the selector knob 29 is placed in the position of registry of the letter M with pointer 31. Also, the mode control knob 32 is rotated in a counterclockwise direction to place the contactor 124 on the contact point 121. At the same time, it pivots the L-shaped arm 112 to terminate the bridging contact between the points 107 and 108 and make bridging contact between the points 117 and 122 which energize the ultraviolet.

The contact point 122 will be energized at this time because of its connection to the terminal strip 102 of member 177. This strip 102 is engaged by the contactor 173 (96 in FIG. 7) at this time because of the location of the knob 29 in the position of registry of the mark M with the pointer 31. Accordingly, power from the supply line 93 is provided at the contact point 122. In view of the fact that these points are bridged, the ultraviolet bulb will be energized so long as these contacts are bridged.

It will be remembered that when the control knob 32 is turned to its most counterclockwise limit, the ultraviolet absorber sheet will cover the window 23. The information printed in black ink on the study paper will be visible through the transparent absorber sheet, but information printed in ultraviolet sensitive ink will not be apparent because the absorber sheet will prevent the ultraviolet from getting through to activate this ink.

Then the student proceeds to slowly turn the mode control knob 32 in the clockwise direction. This moves the absorber sheet toward the front end of the case, thereby uncovering increasing areas of the window 23. As this occurs, the material printed in black light sensitive ink will appear on the paper creating the progressive display effect. Thus, if there are questions or unfilled spaces in the study material, the answers or the fill-in material will appear as the absorber sheet is moved down.

When the knob 32 has been moved down to a point where the absorber sheet covers the last line, the contactor 124 on the arm 126 bridges the points 128 and 129 which applies potential from supply line 93 through the conductive strip 102 and contact point 129 to the contact point 128 and thereby to the switch 86. A hole is provided in the study paper for each frame of the lesson and this hole is detected by sensor 86*a* of switch 86 and permits closure of the switch 86. Therefore, when the points 128 and 129 are bridged, an electrical path through the conductor 131, switch 86 conductor 132 and the operating coil of relay 64 is completed to the return line 94. This energizes the relay 64 causing it to set which closes the switch 134.

Closure of relay switch 134 closes a circuit through the operating coil of motor control relay 66 which closes its switch 138 and energizes the motor 49. The motor then will advance the sheet until the hole in the paper corresponding to the next frame reaches the sensor of the switch 86. Thereupon the switch 86 will again close which resets the relay 64 causing it to open the contacts 134 and thereby deenergize the motor control relay 66. The motor stops and the paper stops and the student is then ready to begin his next lesson which he does by turning the knob 32 to its limit in the counterclockwise direction.

Where the machine is to be used for speed reading purposes, the first step is to turn the selector knob 29 to the position of registry of letter S with the pointer 31. This causes the conductor ring member 173 (wiper 96 in FIG. 7) to bridge the contact strips 103 and 104 of the member 177. This provides a supply line potential at the switch 86. The mode control knob 32 is then placed at registry of the leter S with the pointer 33. This connects supply line potential from the contact point 103 through the conductor 127 and contact 124 of the contact arm 126 to the terminal 121 which supplies the ultraviolet bulb 62. However, the ultraviolet absorber is at this time covering the window 23. The study material may be printed in ordinary black ink so it can be easily seen through the transparent absorber sheet. Therefore, the printed reading material appears even though the ultraviolet absorber is covering the window.

Because the terminal strips 103 and 104 are bridged at all times while the selector knob 29 is in the speed reading position, the supply line 93 is connected to the switch 86 at all times which keeps the relay 64 energized at all times, thus maintaining the switch 134 in the closed condition. As long as switch 134 remains closed, the motor control relay 66 will remain energized to maintain the switch 138 closed and keep the motor 49 operating. Consequently, the motor will operate at all times and the student must read as the motor moves the reading material along under the window. Motor operation can be terminated by turning the selector knob to one of the other rotational positions. However, until this is done, or the line plug is unplugged, the motor will continue to operate.

In the case of the speed reading function, the paper is not wide enough to engage the sensor 86*a* of switch 86. The switch 86 can, therefore, remain closed the entire time. In other words, the paper used for this purpose is narrower than the paper used for the self-study function of the machine. It should also be mentioned at this point, that the paper used for the progressive display phase of operation includes holes which are used to operate the switch 86 for each frame so that the motor 49 will be stopped at appropriate times upon each change of frame.

From the foregoing description, it can be appreciated that the present invention provides a very versatile and yet inexpensive machine. For the many functions which it can perform, the machine is comparatively uncomplicated. It can use many types of materials including, but not limited to, printed and punch paper and combinations of paper and punched tapes. It can use film for presentation of the educational material and can incorporate appropriate holes for the control functions of the machine.

It can readily be recognized that many variations in details can be made within the overall scope of the present invention. Therefore, while the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. An educating machine comprising:

a case having a viewing opening;

means for conveying educational material past said viewing opening, said conveying means having a key receiver therein;

illuminating means producting light of a predetermined character and disposed in a position to illuminate said educational material when said material is exposed in said opening;

conveyor control means;

selector means movable for making and cancelling any of a plurality of possible selections;

counter means coupled to said selector means and operable by moving said selector means, when a selection is made thereby, said selector means being coupled to said control means and enabling operation of said conveying means only after a predetermined correct selection is made, said control means including an electrically operable relay;

a key receivable in said key receiver to thereby prevent operation of said conveying means, said relay being coupled to said key and operable, when energized by moving said selector means to a correct selection, to remove said key from said receiver to enable operation of said conveying means;

and a manually operable member and an absorber for light of said predetermined character, said controller being connected to said manually operable member and movable thereby between a position across said viewing opening and a position away from said viewing opening, the coupling of said controller to said member providing gradual movement of said controller by said member, said controller having a rectilinear margin across the direction of movement of said controller.

2. An educating machine comprising:

an elongated strip of educational material having discrete information units spaced therealong, each of said units having thereon information visible in daylight and additional information thereon visible only in light of a predetermined character and said strip having a control means thereon for each of said information units;

a case having a viewing opening therein;

conveying means for conveying said strip past said opening, said conveying means including a drive motor and having a key receiver therein separate and apart from said strip;

illuminating means operable, when energized, for producing light of said predetermined character and disposed in a position to illuminate said information when said information is exposed in said opening and;

a conveyor control relay having a relay operator;

selector means movable for making and cancelling any of a plurality of possible selections, and coupled to said illuminating means for energization of said illuminating means in response to the making of a certain one of said selections, said selector means being electrically coupled to said control relay in such manner as to enable operation of said conveying means only after a predetermined correct selection is made, the correct selections being predetermined by the locations of said control means on said strip of educational material, the electrical coupling of said selector means to said control relay comprising a movable member of said selector means cooperating with one of said control means, when a correct election is made, to close a switch making a circuit with a source of electrical energy and said relay operator to energize said relay operator, a key normally received in said key receiver and locking said conveying means to thereby prevent operation of said conveying means, and said relay being operable, when the operator thereof is energized to remove said key from said receiver to enable operation of said conveying means.

3. An educating machine comprising:

an elongated strip of educational material having discrete information units spaced therealong, each of said units having thereon information visible in daylight and additional information thereon visible only in light of a predetermined character and said strip having a control means thereon for each of said information units;

a case having a viewing opening therein;

means for conveying said strip past said opening, said conveying means having a key receiver therein;

illuminating means producing light of said predetermined character and disposed in a position to illuminate said information when said information is exposed in said opening;

a conveyor control relay having a relay operator;

selector means movable for making and cancelling any of a plurality of possible selections, said selector means being electrically coupled to said controller to enable operation of said conveyor only after a predetermined correct selection is made, the correct selections being predetermined by the locations of said control means on said strip of educational material, the electrical coupling of said selector means to said controller comprising a movable member of said selector means cooperating with one of said control means, when a correct selection is made, to close a switch making a circuit with a source of electrical energy and said relay operator to energize said relay operator, said relay controlling a key receivable in said key receiver to thereby prevent operation of said conveying means, and said relay being operable, when the operator thereof is energized, to remove said key from said receiver to enable operation of said conveying means;

and a manually operable knob and a controller for light of said predetermined character, said controller being connected to said manually operable knob and movable thereby between a position across said viewing opening and a position away from said viewing opening, the coupling of said controler to said knob providing gradual movement by said knob.

4. An educating machine comprising:

a case having a viewing window therein for exposure of educational material, and having a counter window therein for exposing the register of a counter, and having a door therein accommodating removal of contents therefrom, said viewing window being disposed in said door and said door being in the top of said case;

first and second reels disposed in said case, said first reel having a supply of educational material sheet rolled thereon and said second reel having one end of said sheet connected thereto, whereby said sheet can be rolled from said first to said second reel, said sheet having positive drive apertures therein, and said sheet having a plurality of units of educational material thereon, each of said units including a question (206) printed in black ink and a plurality of proposed answers (207, 208, 209, 211) to said question, said answers each being identified by a different identification character, and one of said answers being correct, and each unit including a plurality of explanations (212, 213, 214) of wrong answers, each explanation being provided in a printing medium responsive to light of a different character from that to which each other is responsive, and each unit having adjacent thereto a plurality of apertures arranged to correspond with the arrangement of the answers and answer explanations thereon;

a synchronizing drive member (38) having positive drive means thereon engaging the positive drive apertures of said sheet, said positive drive member being coupled to an electric motor (49) and drivable thereby when said motor is energized, the construction of said drive member being related to the position of each of said units on said sheet such that one revolution of said drive member will move one unit out of registry with said viewing window and move another unit into registry with said viewing window, said drive member having a key receiving aperture (38*a*) therein;

a first electrically operable relay (66) having control means therein and having controlled means thereon, said controlled means including a first normally-open electrically operable switch (138), and said controlled means further including a key (66*a*) normally received in said aperture in said drive member, said relay being operable when energized to release said key from said aperture in said drive member to accommodate rotation of said drive member by said motor, and said first relay being operable when energized to close said first switch to energize said motor for driving said drive member and thereby for driving said sheet to move one of said units from under the said viewing window and move another of said units into position of registry with said viewing window;

a first manual switch operator (32) rotatable between first and second limits, said first switch operator being operable when actuated to close a first switch (124, 128, 129) when in the first limit thereof and to open said first switch when moved away from said first limit thereof and operable to close a second switch (111, 107, 108) when moved to the first limit thereof and operable to close a third switch (121, 124) when moved to the second limit thereof and operable to open said second switch and close a fourth switch (116, 117, 122) when moved to said second limit thereof, and operable to open said third switch when moved from said second limit thereof, and operable to open said fourth switch and close said second switch when moved to said first limit thereof, said operator being connected to a light absorber sheet (67), the connection of said sheet to said first operator being such that said absorber sheet is disposed above said educational material sheet when said operator is at said second limit, and said absorber sheet is away from said window when said operator is at said first limit;

an ultraviolet bulb;

a "red-light" bulb;

a "green-light" bulb;

an electrically operated registering counter with the register thereof exposed in said counter window, said counter being advanced one-half unit upon energization thereof, and advanced another half unit upon de-energization thereof;

a second manual switch operator, said second manual switch operator including a selector knob (29) rotatable on an axis and having a triggerable contactor (181) keyed to said knob and rotatable therewith, said triggerable contactor having a plurality of contacts, and said contactor being coupled to said second switch, said operator having means (188, 156, 191, 192) normally retaining said contactor in a retracted condition to accommodate rotation of said knob and said contactor, and said operator having a button operated trigger (196) thereon to release said contactor when said knob is in one of six rotational positions, said operator being mounted to a base member (154) having a plurality of apertures therein, said apertures being arranged in concentric circles and radial lines in said circles, the apertures being thereby arranged in a number sufficient to accommodate a predetermined extent of axial travel of said triggerable contactor (181) upon actuation of said trigger to release said contactor, in all of said six rotational positions;

a first rotary contactor (173) in said second operator and coupled to a source of electrical energy and positioned to make electrical connection with said second switch when said triggerable contactor is positioned in any one of a first four of said six rotational positions, said rotary contactor making electrical connection with one contactor (129) of said first switch when said second operator is in a fifth of said rotational positions, and said rotary contactor making electrical connection with another contactor (128) of said first switch when said second operator is in the sixth of said rotational positions;

a support (87*a*) disposed under said base member with said educational sheet passing between said base member and said support and supported by said support, said support having a plurality of apertures therein registering with the apertures in said base member, and said support having a plurality of spring loaded conductive members therein with pins projecting upwardly through said apertures therein, said pins being thereby engageable by said triggerable contactor when released where said apertures in said educational material sheet are in registry with apertures in said support, a first group of four of said pins (G–1, G–2, G–3, G–4) being disposed in equally spaced relation to each other in an outer circle and connected to said green bulb, a second group of four of said pins (B–1, B–2, B–3, B–4) being disposed in equally spaced relation to each other in an intermediate circle and connected to said ultraviolet bulb, a third group of four of said pins (R–1, R–2, R–3, R–4) being disposed in equally spaced relationship to each other in said intermediate circle but in a sector of said circle diametrically opposite said second group of four pins, said third group of four pins being connected to said red bulb, a fourth group of four pins (M–1, M–2, M–3, M–4) being disposed in said outer circle but disposed in a sector of said circle diametrically opposite the sector having said first group of four pins thereon, the four pins of said fourth group being connected to said first electrically operated relay (66), and a fifth group of four of said pins (C–1, C–2, C–3, C–4) being disposed in an inner circle radially inward from said intermediate circle, the pins of said fifth group being connected to said counter, each pin of each of said five groups being disposed on a common radius with a pin of each other of said five groups;

a first normally-closed sheet position sensor switch (86) including a sensor engageable with said sheet to keep said sensor switch open, said sensor being receivable in an aperture of said sheet material to thereupon permit closure of said sheet position sensor switch, said sensor switch being connected to said another contactor (128) of first switch;

a second electrically operated relay (64) connected between said source of electrical energy and said sensor switch and operable, when first energized, to close a second electrically operated switch (134), said second electrically operated switch being connected in circuit with the control means for said first electrically operated relay (66) and said source of energy to energize said first relay and close said first electrically operated switch to make an electrical circuit through said motor and energize said motor for control of said motor when said second switch operator knob is in a fifth of said six rotational positions thereof, said second electrically operated relay holding said second electrically operated switch closed when said relay is de-energized and being operable when next energized to open said second electrically operated switch and thereby open said first electrically operated switch to de-energize said motor.

5. An educating machine comprising:

a case having a viewing opening therein for exposure of educational material;

first and second reels disposed in said case, said first reel being disposed to hold a supply of educational material sheet thereon and said second reel being disposed to have said sheet connected thereto whereby said sheet can be rolled from said first to said second reel;

a drive member having positive drive means thereon for engaging positive drive means of said sheet, said positive drive member being coupled to an electric motor and drivable thereby, said drive member having first keying means therein;

a first electrically operable relay having control means therein and having controlled means thereon, said controlled means including a first normally-open electrically operable switch, and said controlled means further including second keying means normally engaging said first keying means in said drive member, said relay being operable when energized to disengage said keying means to accommodate rotation of said drive member by said motor, and said first relay being operable when energized to close said first switch to energize said motor for driving said drive member;

a first lamp for producing light of a first character;

a second lamp for producing light of a second character;

a manual switch operator, said manual switch operator including a selector knob rotatable on an axis and having a triggerable contactor keyed to said knob and rotatable therewith, said triggerable contactor having a plurality of contacts, said operator having retainer means normally retaining said contactor in a retracted condition to accommodate rotation of said knob and said contactor, and said operator having a button associated therewith and button operated release means thereon to release said contactor when said knob is in one of a plurality of discrete rotational positions, said operator being mounted to a base member having a plurality of apertures therein, said apertures being arranged in concentric circles and radial lines in said circles, the apertures being thereby arranged in a number sufficient to accommodate a predetermined extent of axial travel of said triggerable contactor upon actuation of said trigger to release said contactor, in all of said discrete rotational positions;

rotary contactor means in said switch operator and coupled to a source of electrical energy and to said triggerable contactor and maintaining a coupling of said triggerable contactor to said source while said knob is in at least two of said plurality of discrete rotational positions;

a support disposed adjacent said base member and spaced therefrom to permit passage of said sheet between said base member and said support, said support having a plurality of resilient conductive members therein registering with the apertures in said base member, said conductive members being engageable by said triggerable contactor when released where apertures in the sheet passing between said base member and said support are in registry with apertures in said support, certain of said conductive members being coupled through said first lamp to said source and others of said conductive members being coupled through said second lamp to said source and still others of said conductive members being coupled to said first relay, whereby operation of said button at one of said discrete positions of said knob may energize a lamp and at another of said discrete positions may energize said motor as determined by the presence of said sheet between certain of said members and said apertures.

6. The machine of claim 5 wherein:

ramp means are provided between adjacent apertures in a circle in said base member, said ramp means being engageable by a contact of said triggerable contactor as said knob is rotated from one of said discrete positions to the next of said discrete positions, said ramp means having sufficient rise to return the triggerable contactor to retracted condition as said knob is rotated thereby enabling said retainer means to again retain said triggerable contactor in retracted condition.

7. The machine of claim 5 wherein:

ramp means are provided between adjacent apertures in a circle in said base member, said ramp means being engageable by a contact of said triggerable contactor as said knob is rotated from one of said discrete positions to the next of said discrete positions, said ramp means having sufficient rise to return the triggerable contactor to retracted condition as said knob is rotated thereby enabling said retainer means to again retain said triggerable contactor in retracted condition, each of said ramp means including a crest between adjacent apertures and a ramp from each of said adjacent apertures ascending to said crest, whereby said triggerable contactor is returnable to said retracted condition upon rotation of said knob in a clockwise sense and in a counterclockwise sense.

8. The machine of claim 5 wherein:

said retainer means includes;

a retainer pin received in and axially movable in said triggerable contactor;

a spring biasing said pin radially inwardly toward said axis and against a stop;

and a post secured to said base member and having a ledge thereon supporting said retainer pin and thereby supporting said triggerable contactor in retracted condition.

9. The machine of claim 5 wherein:

said retainer means includes;

a retainer pin received in and axially movable in said triggerable contactor;

a spring biasing said pin radially inwardlly toward said axis and against a stop;

and a post secured to said base member and having a ledge thereon supporting said retainer pin and thereby supporting said triggerable contactor in retracted condition;

and said release means includes;

a plurality of release pins disposed in said post and extending radially with respect to said axis, one of said release pins being engageable with said retainer pin when said knob is in each of said discrete positions thereof;

each of said release pins having a cam follower portion thereon;

a stem on said button, said stem having an annular groove therein receiving said cam follower portion of the release pin engaged by said retainer pin, said stem being movable transversely of said release pin upon operation of said button to thereupon force said follower portion of the engaged release pin out of said groove to linearly move said engaged release pin and thereby linearly move said retainer pin off said ledge to thereupon release said triggerable contactor.

10. In an electrical machine, the combination comprising:

a selector knob rotatable on an axis and having a triggerable contactor keyed to said knob and rotatable therewith, said triggerable cotactor having a plurality of contacts;

retainer means normally retaining said contactor in a retracted condition to accommodate rotation of said knob and said contactor;

a button and button operated release means to release said contactor when said knob is in one of a plurality of discrete rotational positions;

a base member having a plurality of apertures therein, said apertures being arranged in concentric circles and radial lines in said circles, the apertures being thereby arranged in a number sufficient to accommodate a predetermined extent of axial travel of said triggerable contactor upon actuation of said trigger to release said contactor, in all of said discrete rotational positions;

rotary contactor means coupled to said triggerable contactor for maintaining a coupling of said triggerable contactor to a source of electrical energy while said knob is in at least two of said plurality of discrete rotational positions;

and a support disposed adjacent said base member and spaced therefrom to permit passage of a sheet between said base member and said support, said support having a plurality of resilient conductive members therein registering with the apertures in said base member, said conductive members being engageable by said triggerable contactor when released where apertures in a sheet passing between said base member and said support are in registry with apertures in said support.

11. The combination of claim 10 wherein:

ramp means are provided between adjacent apertures in a circle in said base member, said ramp means being engageable by a contact of said triggerable contactor as said knob is rotated from one of said discrete positions to the next of said discrete positions, said ramp means having sufficient rise to return the triggerable contactor to retracted condition as said knob is rotated thereby enabling said retainer means to again retain said triggerable contactor in retracted condition.

12. The combination of claim 10 wherein:

ramp means are provided between adjacent apertures in a circle in said base member, said ramp means being engageable by a contact of said triggerable contactor as said knob is rotated from one of said discrete positions to the next of said discrete positions, said ramp means having sufficient rise to return the triggerable contactor to retracted condition as said knob is rotated thereby enabling said retainer means to again retain said triggerable contactor in retracted condition, each of said ramp means including a crest between adjacent apertures and a ramp from each of said adjacent apertures ascending to said crest, whereby said triggerable contactor is returnable to said retracted condition upon rotation of said knob in a clockwise sense and in a counterclockwise sense.

13. The combination of claim 10 wherein:

said retainer means includes;

a retainer pin received in and axially movable in said triggerable contactor;

a spring biasing said pin radially inwardly toward said axis and against a stop;

and a post secured to said base member and having a ledge thereon supporting said retainer pin and thereby supporting said triggerable contactor in retracted condition.

14. The combination of claim 10 wherein:

said retainer means includes;

a retainer pin received in and axially movable in said triggerable contactor;

a spring biasing said pin radially inwardly toward said axis and against a stop;

and a post secured to said base member and having a ledge thereon supporting said retainer pin and thereby supporting said triggerable contactor in retracted condition;

and said release means includes;

a plurality of release pins disposed in said post and extending radially with respect to said axis, one of said release pins being engageable with said retainer pin when said knob is in each of said discrete positions thereof;

each of said release pins having a cam follower portion thereon;

a stem on said button, said stem having an annular groove therein receiving said cam follower portion of the release pin engaged by said retainer pin, said stem being movable transversely of said release pin upon operation of said button to thereupon force said follower portion of the engaged release pin out of said groove to linearly move said engaged release pin and thereby linearly move said retainer pin off said ledge to thereupon release said triggerable contactor.

References Cited by the Examiner

UNITED STATES PATENTS

| | | | |
|---|---|---|---|
| 2,402,162 | 6/1946 | Holt | 35—9 |
| 2,953,859 | 9/1960 | Fink | 35—9 |
| 3,056,215 | 10/1962 | Skinner | 35—9 |
| 3,068,010 | 12/1962 | Hegopian | 35—9 |
| 3,175,303 | 3/1965 | Kirkconnel | 35—9 |

EUGENE R. CAPOZIO, *Primary Examiner*.

R. E. KLEIN, *Assistant Examiner*.